June 27, 1972 T. W. O'KEEFFE ET AL 3,672,987

MASKED PHOTOCATHODE AND METHOD OF MAKING SAME

Original Filed Dec. 18, 1968 2 Sheets-Sheet 1

WITNESSES

Alfred G. Colaizzi

James F. Young

INVENTORS

Terence W. O'keeffe

Jerome R. Morris

C. L. Menzemer

ATTORNEY

MASKED PHOTOCATHODE AND METHOD OF MAKING SAME 3,672,987

MASKED PHOTOCATHODE AND METHOD OF MAKING SAME

Terence W. O'Keeffe, Pittsburgh, and Jerome R. Morris, Trafford, Pa., assignors to Westinghouse Electric Corporation, Pittsburgh, Pa.

Original application Dec. 18, 1968, Ser. No. 784,801. Divided and this application Dec. 23, 1969, Ser. No. 887,707
Int. Cl. H01j 31/06
U.S. Cl. 117—212 2 Claims

ABSTRACT OF THE DISCLOSURE

A masked photocathode is provided having on a radiation transmissive support a mask pattern of a material that absorbs or reflects sensitizing radiation particularly in the ultraviolet. In one form, the mask is formed in a process that includes at least partial oxidation of a metal layer pattern. Alternatively, a mask pattern that blocks all radiation with high reflectivity may be formed by employing a metal with a subsequent insulating layer, such as of an oxide of the metal or a separately deposited insulator, for protection from the photocathode. In another form the photoemissive layer may be deposited directly on the transmissive support and have on its surface a pattern of organic material to provide the mask for electrons on the target side of the cathode as well as to prevent any radiation reflected from the target from impinging on areas from which photoemission is not desired.

ACKNOWLEDGEMENT OF GOVERNMENT CONTRACT

The invention herein described was made in the course of or under a contract with the Department of the Air Force.

Related applications

This application is a division of application Ser. No. 784,801 filed Dec. 18, 1968.

BACKGROUND OF THE INVENTION

Field of the invention

This invention is related to masked photocathodes, particularly those intended for exposure to an air environment, useful in the fabrication of microelectronic components.

Description of the prior art

In copending application Ser. No. 724,839 filed Apr. 29, 1968, by T. W. O'Keeffe and assigned to the assignee of the present invention, there were disclosed techniques for the fabrication of masked photocathodes operable in an air environment and employing a layer of a material selectively absorbing ultraviolet radiation such as a material containing titanium ions. In one form the mask material was deposited on the surface of a transmissive substrate that had been etched in the desired mask pattern so that upon subsequent polishing a planar surface with an embedded mask was achieved. It is now considered preferable to avoid the polishing operation because such a step tends to produce scratches in the transmissive substrate, such as quartz, and also in the mask layer unless considerable care is taken. Scratches in either portion can produce flaws in the projected image. Minor scratches occurring in the surface of the polished quartz starting material are also accentuated in the etching step.

Mask layers that selectively absorb ultraviolet may transmit other waveband radiation that can impinge the target and cause thermal problems in it or in the photocathode.

An additional problem in some cases with a mask on the input side of the photoemitter is that the photoemissive layer may not utilize all the ultraviolet radiation impinging thereon with the result that some passes through and impinges on the target. Such radiation may be reflected from the target and returned to the photoemitter with all of the photoemissive area exposed so that spurious emission results.

SUMMARY OF THE INVENTION

This invention has among its purposes and objects the provision of improved masked air stable photocathodes and improved methods for their fabrication, to avoid or minimize the above mentioned problems.

By improvement over the technique of the above copending application a layer of metal, such as titanium, chromium, or aluminum, is deposited on the flat surface of a transmissive support, formed in the desired mask pattern and then at least partially oxidized or otherwise protected by an insulating layer so that upon subsequent deposition of a photoemissive layer it is protected in the event the photoemissive layer is removed or replaced.

In another form of the invention, the photoemissive layer is applied directly to the radiation transmissive support and the mask is provided by elements of electron opaque organic material on the target side of the photoemitter to avoid effects of reflected radiation.

BRIEF DESCRIPTION OF THE DRAWING

FIGS. 7 to 10 are views of an alternative form of the invention at various stages of fabrication wherein FIGS. 7 and 9 are plan views and FIGS. 8 and 10 are sectional views;

DESCRIPTION OF THE PREFERRED EMBODIMENTS

Figure 1:
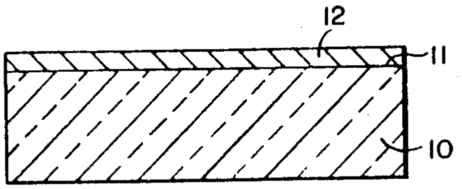
FIGS. 1 to 6 are sectional views of a masked photocathode in accordance with this invention at different stages of fabrication.

In FIG. 1 is a radiation transmissive support 10, suitably of fused quartz. The support 10 has a planar surface 11 on which is a continuous metal layer 12. The metal layer may be of any of a number of metals, such as titanium, aluminum, and chromium, selected in accordance with properties as will be described hereinafter.

Figure 2:
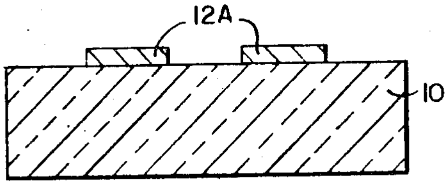

In FIG. 2, the structure is shown after the metal layer 12 has been processed into a first metallic pattern 12A, such as by conventional photolithographic techniques.

Figure 3:
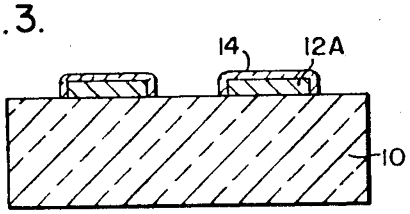

In FIG. 3, the metal pattern 12A has disposed over the surface of each element a layer 14 of a protective insulator which has been formed by chemical reaction with the material of the first metallic pattern, such as by oxidation. The insulating layer 14 is preferably one that selectively absorbs the radiation to which the photocathode is sensitive, particularly ultraviolet radiation. The reason for this is because the oxidation, or other chemical reaction, is consequently non-critical and all of the metal may be converted. For this purpose it is preferable to form the metalic pattern of titanium, the oxide of which contains titanium ions that selectively absorb ultraviolet radiation. However, it may be preferable in some cases to retain a portion of the first metallic pattern 12A to reflect unabsorbed radiation, such as the visible band, so that it does not pass through the structure and produce adverse thermal effects in the target.

Preparation of the structure of FIG. 3 may be by first lightly oxidizing the surface of the continuous layer 12 of FIG. 1 before forming the pattern and then partially oxidizing the remaining titanium at about 400° C. for about 1 to 3 hours for a titanium layer about 400 angstroms thick. If the titanium is completely oxidized the resulting oxide pattern should be about 700 angstroms or more thick.

Figure 4:
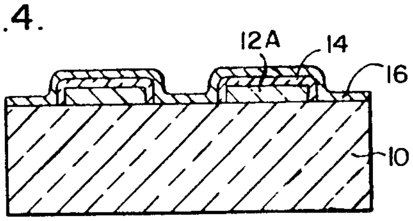

In FIG. 4 the structure has applied over the protected metallic pattern layer a continuous layer 16 of a photoemitter. In the context of this invention it is preferred that the photocathode be of an air stable material so it may be used in demountable systems. See copending application Ser. No. 753,373, filed Aug. 19, 1968, by T. W. O'Keeffe and R. M. Handy and assigned to the assignee of this invention as well as the above mentioned copending application Ser. No. 724,839. For this purpose the photocathode is at least one number selected from the group consisting of palladium, platinum, barium, gold, aluminum, copper and cesium iodide.

FIG. 4 thus illustrates a completed masked photocathode not only masked against radiation in those areas where it is undersired to produce emission from the photocathode but also providing a metallic reflective surface from which other radiation such as visible radiation would be reflected to avoid heat problems in the target.

Figure 5:
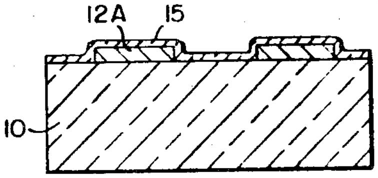
Figure 6:
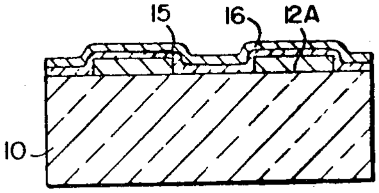

The structure of FIG. 2 may alternatively be processed in accordance with the sequence illustrated in FIGS. 5 and 6.

In FIG. 5 there has been applied to the surface a continnous layer 15 of an insulating protecting material. Since this layer is continuous it is necessary that it be radiation transmissive to the sensitizing radiation. For this purpose it may be of quartz and deposited by known techniques such as RF sputtering.

In FIG. 6 the structure is completed by the deposition of a photocathode layer 16. For some purposes the sequence illustrated in FIGS. 5 and 6 may be preferred particularly in that there is a wider choice in selecting the metal. It may, for example, be of aluminum which is more highly reflective than titanium and further minimizes the adverse heat effect previously discussed.

The photocathode in accordance with this invention may have a mask pattern of any geometrical configuration. Forms of the invention illustrated in FIGS. 4 and 6 are suitable where an electron image is to be made that is to be applied directly to a workpiece, such as an electron resist coated semiconductor wafer. In certain instances it is desired that the mask produce a plurality of essentially point sources of electrons that are then subjected to electrostatic and/or magnetic deflection techniques to scan patterns in one or more workpieces. Reference should be made to copending application Ser. No. 784,551, filed Dec. 18, 1968 by T. W. O'Keeffe and assigned to the assignee of the present invention with respect to the utilization of such arrays of point electron sources.

Figure 7:
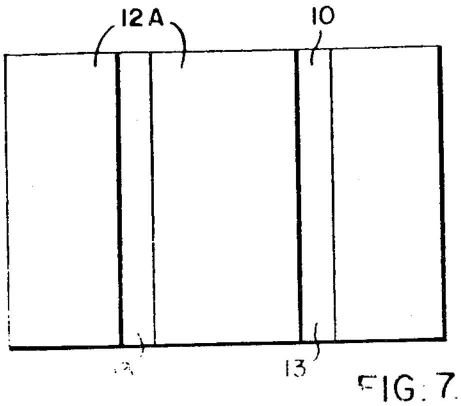
Figure 8:
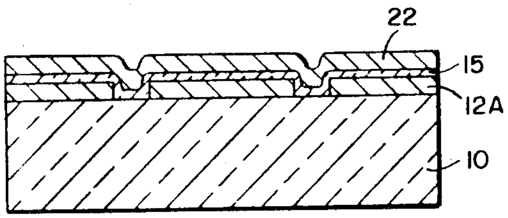
Figure 9:
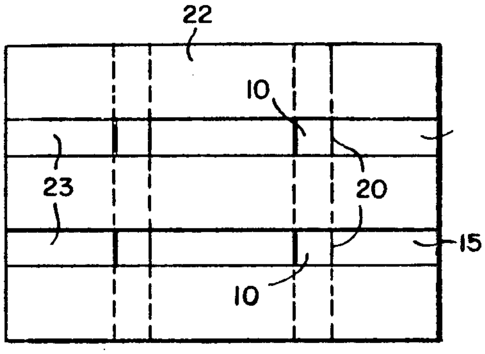

FIGS. 7 to 9 illustrate a technique of making such an array. In FIG. 7 the top surface of a substrate 10 is illustrated after there has been formed thereon a first metallic pattern 12A that comprises a pluarlity of parallel stripes that leave openings 13 therebetween of substantially less width than the width of the metallic stripes.

Figure 10:
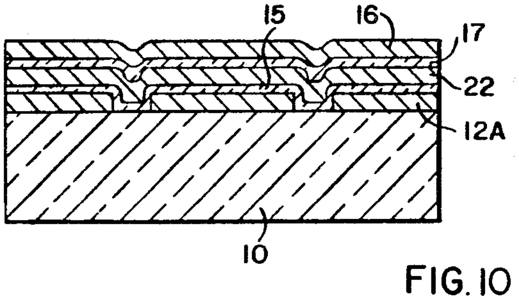

In FIG. 8 the first metallic pattern 12A has been protected by an insulating protective coating 15 substantially as in FIG. 5; the technique illustrated in FIG. 3 may also be employed. Subsequent thereto has been deposited a second metallic layer formed into a pattern 22, further illustrated in FIG. 9, that also comprises a plurality of parallel metallic stripes with openings 23 therebetween of substantially less width than the metallic stripes, the stripes being perpendicular to those of the first pattern 12A. An additional protective insulator layer 17 and a photocathode layer 16 are then deposited continuously as shown in FIG. 10.

The two metallic patterns 12A and 22 therefore provide openings 20, FIG. 9, that can be of quite small dimensions depending on the resolution with which each metallic pattern may be obtained. This form of the invention is suitable where there is available a source of electrons in a line to expose resist used in making patterns, 12A and 22. Such an electron source is often more readily obtained and precisely controlled than a point source.

Figure 11:
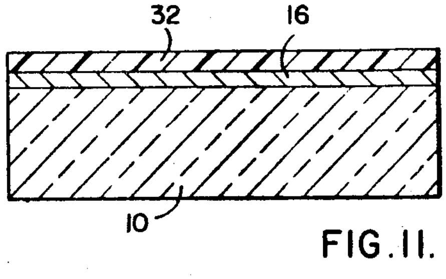
FIGS. 11 and 12 are sectional views at different stages of fabrication in accordance with an alternative embodiment of the invention.
Figure 12:
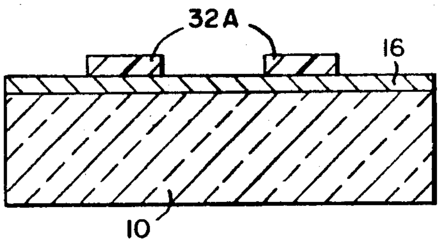
Figure 13:
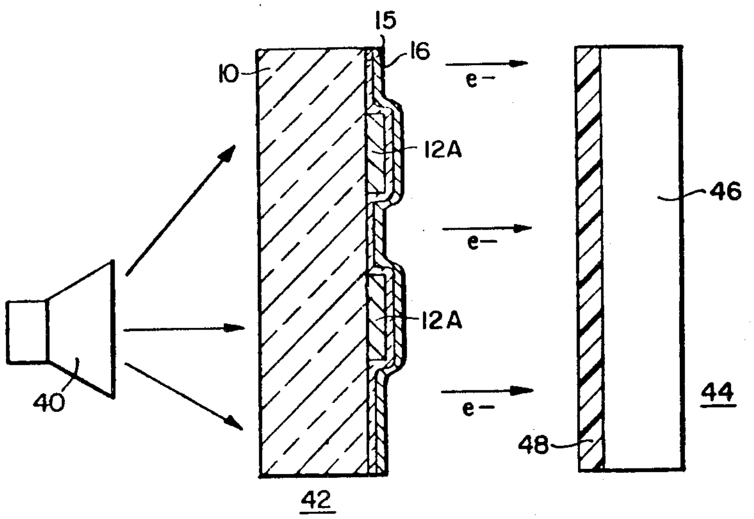
FIG. 13 illustrates an arrangement employing a masked photocathode in accordance with this invention.

FIGS. 11 and 12 illustrate a form of the invention directed to an additional problem. If a masked photocathode in the form of FIGS. 4 or 6 has only a small area that is to be blocked then the unused ultraviolet radiation passing through to the target could produce considerable back scattering that would produce emission from all portions of the photocathode. Therefore in these instances it is desirable to employ a readily formed electron mask pattern on the target side of the photocathode material.

In FIG. 11 the radiation transmissive support 10 has directly thereon a continuous layer 16 of photocathode material and a subsequent layer 32 from which the mask is to be formed. The layer 32 is of an organic material that may be selectively polymerized or made soluble (as by light or electron bombardment) and developed in a mask pattern 32A as illustrated in FIG. 11. Such a material should block electron emission from cathode 16. Suitable materials include members of the group consisting of co-polymers of acrylic and methacrylic acids and esters. Such materials may be formed either with or without chemical modification involving the introduction of polar side groups in the main non-cross linked polymeric chain, although other organic materials including hydrocarbon pump oils have been used.

Photocathodes in accordance with this invention are particularly for use with a high intensity broadband light source such as a mercury vapor lamp for fast formation of an electron image at the cathode. FIG. 12 illustrates the general arrangement of light source 40, masked photocathode 42 (of the form shown in FIG. 6), and an electron resist coated workpiece 44. The workpiece 44 may include an oxidized wafer 46 of semiconductor material having on the surface toward the cathode a layer 48 of organic resist material. Further description of the use of photocathodes in accordance with this invention may be found by reference to the above mentioned copending application Ser. No. 753,373.

We claim as our invention:

1. A process of making a masked photocathode comprising the steps of:

forming a first metallic pattern on a radiation transmissive support;

forming a first insulating protective layer over at least said first metallic pattern;

forming a second metallic pattern coinciding only in part with said first metallic pattern to define a plurality of radiation transmissive openings;

forming a second insulating protective layer over at least said second metallic pattern; and depositing over said second insulating protective layer a continuous layer of photocathode material.

2. The subject matter of claim 1 wherein:

said first and second metallic patterns each comprise a plurality of parallel metallic strips with strip-like openings therebetween of substantially less width than that of said parallel metallic strips, said first and second metallic patterns being mutually perpendicular.

References Cited

UNITED STATES PATENTS

| | | | |
|---|---|---|---|
| 2,613,330 | 10/1952 | Bruining et al. | 313—102 X |
| 2,977,252 | 3/1961 | Causse et al. | 313—94 |
| 3,310,701 | 3/1967 | Heimann | 313—94 |
| 3,237,271 | 1/1966 | Arnold et al. | 17—212 X |
| 3,313,971 | 4/1967 | Nugy | 313—94 |
| 2,717,971 | 4/1955 | Sheldon | 313—65 |
| 3,380,156 | 4/1968 | Lood et al. | 117—212 |

RALPH S. KENDALL, Primary Examiner

U.S. Cl. X.R.

117—211; 313—94